(12) United States Patent
Hirano

(10) Patent No.: US 8,406,584 B2
(45) Date of Patent: Mar. 26, 2013

(54) FIBER OPTIC DEVICE

(75) Inventor: Masaaki Hirano, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 352 days.

(21) Appl. No.: 12/871,624

(22) Filed: Aug. 30, 2010

(65) Prior Publication Data

US 2011/0052119 A1 Mar. 3, 2011

(30) Foreign Application Priority Data

Aug. 31, 2009 (JP) ................. 2009-200246

(51) Int. Cl.
*G02B 6/28* (2006.01)
(52) U.S. Cl. ............... 385/24; 385/15; 385/16; 385/23; 385/122
(58) Field of Classification Search .................... 385/15, 385/16, 23, 24, 122
See application file for complete search history.

(56) References Cited

U.S. PATENT DOCUMENTS

| | | | | |
|---|---|---|---|---|
| 5,920,588 | A | * | 7/1999 | Watanabe ................. 372/96 |
| 6,424,774 | B1 | * | 7/2002 | Takeda et al. ............. 385/122 |
| 7,202,994 | B2 | | 4/2007 | Okuno et al. |
| 7,292,748 | B2 | * | 11/2007 | Tsukitani et al. ........... 385/24 |
| 2002/0118439 | A1 | | 8/2002 | Batchko |
| 2007/0053641 | A1 | | 3/2007 | Hirano et al. |
| 2007/0258717 | A1 | | 11/2007 | Hirano et al. |

FOREIGN PATENT DOCUMENTS

| | | |
|---|---|---|
| GB | 2 299 176 A | 9/1996 |
| JP | 2007-072182 | 3/2007 |

OTHER PUBLICATIONS

Hirano, M. "Silica-based Highly Nonlinear Fiber as Platform for Optical Processings," AIP Conference Proceedings, vol. 1055, pp. 73-76, (2008).
Hirano et al., "Selective FWM-based Wavelength Conversion Realized by Highly Nonlinear Fiber," European Conference on Optical Communications, ECOC 2006, vol. 4, pp. 21-22, (Sep. 2006).
Agrawal, G. "7.7 Optical Phase Conjugation," in *Fiber Optic Communication Systems*, John Wiley & Sons, Inc., p. 300 (2002).
Watanabe et al., "Compensation of Pulse Shape Distortion Due to Chromatic Dispersion and Kerr Effect by Optical Phase Conjugation," IEEE Photonics Technology Letters, vol. 5, No. 10, pp. 1241-1243 (1993).

(Continued)

*Primary Examiner* — Jennifer Doan
(74) *Attorney, Agent, or Firm* — Venable LLP; Michael A. Sartori; Tamatane J. Aga

(57) ABSTRACT

A fiber optic device outputs, at high conversion efficiency, an idler lightwave having a wavelength $\lambda_2$ different from the wavelength of a signal lightwave by converting the signal lightwave having an optional wavelength $\lambda_1$ in a wide wavelength band. The fiber optic device comprises a wavelength tunable pump light source for outputting a pump lightwave having a wavelength of $2 \times (\lambda_1^{-1} + \lambda_2^{-1})^{-1}$; a optical coupler for coupling and outputting the pump lightwave and the signal lightwave; and an optical fiber having a length of 450 m or less, the zero-dispersion wavelength thereof being in the wide wavelength band, the dispersion slope thereof at the zero-dispersion wavelength being +0.01 ps/nm$^2$/km or more and +0.045 ps/nm$^2$/km or less, wherein the optical fiber allows propagation of the signal lightwave and the pump lightwave output from the optical coupler, and generates an idler lightwave by means of the nonlinear optical phenomenon that occurs during such propagation.

11 Claims, 14 Drawing Sheets

OTHER PUBLICATIONS

Okuno et al., "Highly Non-linear and Perfectly Dispersion-Flattened Fibres for Efficient Optical Signal Processing Applications", Electronic Letters, vol. 39, No. 13, pp. 972-974, Jun. 2003.

Takahashi et al., "Low-Loss and Low-Dispersion-Slope Highly Nonlinear Fibers", Journal of Lightwave Technology, vol. 23, No. 11, pp. 3615-3624, Nov. 2005.

Joergensen et al., "Dispersion Flattened Highly Non-Linear Fiber", ECOC IOCC 2003 Proceedings, vol. 3, pp. 556-557, 2003.

K.P. Hansen, "Dispersion Flattened Hybrid-Core Nonlinear Photonic Crystal Fiber", Optics Express, vol. 11, No. 13, pp. 1503-1509, Jun. 2003.

Zhang et al., "Broadband Wavelength Converter Based on Four-Wave Mixing in a Highly Nonlinear Photonic Crystal Fiber", Optic Letters, vol. 30, No. 18, pp. 2375-2377, Sep. 2005.

Hirano et al., "Silica-Based Higly Nonlinear Fibers and Their Application", IEEE Journal of Selected Topics in Quantum Electronics, vol. 15, No. 1, pp. 103-113, Feb. 2009.

Examination Report for European Patent Application No. 10 174 637.8 dated Mar. 12, 2012.

* cited by examiner

FIBER OPTIC DEVICE

BACKGROUND OF THE INVENTION

1. Field of the Invention

The present invention relates to a fiber optic device in which an idler lightwave having a wavelength that is different from the wavelength of input signal lightwave is generated using an optical fiber.

2. Description of the Background Art

A fiber-based optical signal processing device which uses a nonlinear phenomenon that occurs in an optical fiber is known in the art. Particularly, a device that performs wavelength conversion using the four-wave mixing (FWM) that occurs in an optical fiber is widely used for processing a high-speed signal, because not only can it be used in a broad wavelength range, but also its conversion efficiency is high (e.g., see Japanese Patent Application Publication No. 2007-72182).

In this fiber optic device, in order to output an idler lightwave with an optional wavelength from a signal lightwave having an arbitrary wavelength that has been input into the fiber optical device, it is necessary to change the wavelength of a pump lightwave, corresponding to the wavelength of the input signal lightwave and that of the idler lightwave. Also, it is necessary to reduce the absolute value of the second order dispersion at the pump wavelength as much as possible. Therefore, studies have been made with respect to the wavelength conversion using a dispersion-flattened fiber which exhibits less variation in the second order dispersion value in a wide wavelength range corresponding to the pump wavelength (For example, refer to Non-patent documents 1 to 5).

The productivity of the dispersion-flattened fibers as used in Non-patent documents 1 to 5 is poor because the dispersion value changes according to minimal variation in the core diameter. Also, the nonlinear coefficient is smaller as compared with a generally used highly non-linear fiber. As for photonic crystal fibers (PCF) used for Non-patent documents 4 and 5, it is difficult to control the diameter and the position of their through-holes, and therefore it is difficult to control the second order dispersion value, which would pose a problem in practical applications.

SUMMARY OF THE INVENTION

Problems to be Solved by the Invention

The object of the present invention is to provide a fiber optic device in which a signal lightwave having an arbitrary wavelength within a wide range of wavelength can at high conversion efficiency be converted to have an optional wavelength different from that of the signal lightwave so as to be output as an idler lightwave.

Means for Solving the Problems to be Solved

A fiber optic device relating to the present invention, which generates an idler lightwave having a wavelength $\lambda_2$ from a signal lightwave having a wavelength $\lambda_1$ and having been input into the fiber optic device, the wavelength $\lambda_1$ being included in a first wavelength band between wavelength $\lambda_x$ and wavelength $\lambda_y$, and the wavelength $\lambda_2$ being included in a second wavelength band and different from the wavelength $\lambda_1$, comprises a wavelength tunable pump light source that outputs a pump lightwave having a wavelength of $2\times(\lambda_1^{-1}+\lambda_2^{-1})^{-1}$, a optical coupler that combine the pump lightwave and the signal lightwave to output them, and an optical fiber having a length of 450 m or less whose zero-dispersion wavelength lies in the first wavelength band and whose dispersion slope at the zero-dispersion wavelength is +0.01 ps/nm²/km or more and +0.045 ps/nm²/km or less, wherein the optical fiber allows propagation of the signal lightwave and the pump lightwave from the optical coupler, and generates an idler lightwave through the nonlinear optical phenomenon that occurs during such propagation.

Here, the embodiment may be such that the first wavelength band includes at least either of a band having wavelength of 1530 to 1565 nm and a band having wavelength of 1570 to 1605 nm. Also, the embodiment may be such that the second wavelength band includes at least either of the 1530 to 1565 nm wavelength band and the 1570 to 1605 nm wavelength band. Alternatively, the embodiment may be such that at least either of the first wavelength band and the second wavelength band has both of the1530 to 1565 nm wavelength band and the 1570 to 1605 nm wavelength band.

DETAILED DESCRIPTION OF THE INVENTION

Hereinafter, in reference to the accompanying drawings, the explanation of the invention will be given in detail. In the explanation of the drawings, an identical mark is put on the same element, and a repetition of explanation will be omitted.

Figure 1:
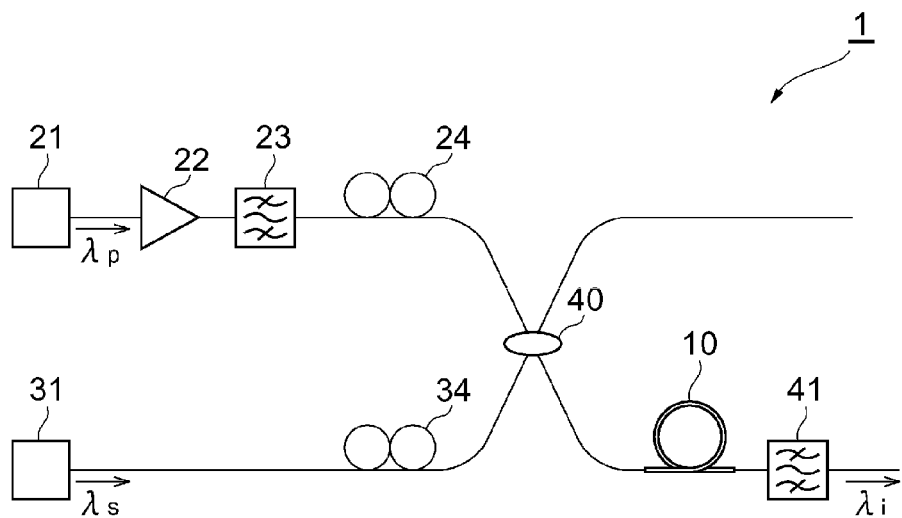
FIG. 1 is a conceptional schematic diagram of a fiber optic device according to Embodiment 1 of the present invention.

FIG. 1 is a conceptional schematic diagram of a fiber optic device according to Embodiment 1 of the present invention. A fiber optic device 1 comprises an optical fiber 10, a pump light source 21, an optical amplifier 22, a bandpass filter 23, a polarization controller 24, a polarization controller 34, an optical coupler 40 and a bandpass filter 41.

The optical fiber 10 allows signal lightwave and pump lightwave to be input so as to propagate therein and generates an idler lightwave having a wavelength different from the wavelengths of the signal lightwave and the pump lightwave by means of a nonlinear optical phenomenon which occurs during such propagation. More specifically, a highly non-linear fiber (HNLF) is used as the optical fiber 10, and in particular, a dispersion-shifted HNLF (DS-HNLF) is preferably used. The wavelength conversion made by the optical fiber 10 will be described later.

The pump light source 21 is a wavelength-tunable light source which generates a pump lightwave of wavelength $\lambda_p$. A signal light source 31 which is arranged outside the fiber optic device 1 generates a signal lightwave with wavelength $\lambda_s$. The optical amplifier 22 optically amplifies the pump lightwave output from the pump light source 21, and outputs the pump lightwave thus amplified. Of lightwaves output from the optical amplifier 22, a lightwave having a wavelength $\lambda_p$ is selectively allowed to pass through the bandpass filter 23 and output therefrom. The polarization controller 24 controls the polarization state of the pump lightwave $\lambda_p$ output from the bandpass filter 23 and outputs the pump lightwave.

Examples of the optical amplifier 22 includes a Raman amplifier, an optical semiconductor amplifier (OSA), etc., as well as an erbium doped fiber amplifier (EDFA) and a thulium doped fiber amplifier (TDFA), which are rare earth doped optical amplifiers. If the pump lightwave output from the pump light source 21 has sufficiently high power, more specifically from tens of mW to several W, for example, it is unnecessary to provide the optical amplifier 22. Also, the bandpass filter 23 is not indispensable; however, if the noise from the optical amplifier 22 is significant, it is possible to enhance the optical signal noise ratio of the idler lightwave $\lambda_i$ by providing the bandpass filter 23.

The polarization controller 34 provided on the optical path of signal lightwave $\lambda_s$ controls the polarization state of signal lightwave $\lambda_s$ output from the signal light source 31 and then outputs the signal lightwave. The polarization controller 34 and the polarization controller 24 are used for making the polarization states of pump lightwave $\lambda_p$ and signal lightwave $\lambda_s$ coincident so as to enhance the output power of idler lightwave $\lambda_i$; however, they are not indispensable. Either of the polarization controller 24 and the polarization controller 34 may be provided on the optical path. The polarization controller 24 and the polarization controller 34 are unnecessary in the case where the polarization state is made random by subjecting at least either one of the pump lightwave $\lambda_p$ and the signal lightwave $\lambda_s$ to polarization scrambling.

The optical coupler 40 combines the pump lightwave $\lambda_p$ that has been output from the polarization controller 24 and the signal lightwave $\lambda_s$ that has been output from the polarization controller 34, and outputs both the pump lightwaves $\lambda_p$ and signal lightwave $\lambda_s$. A spatial optical system can also be used as the optical coupler 40. The optical fiber 10 receives the pump lightwave $\lambda_p$ and signal lightwave $\lambda_s$ which have been combined and output by the optical coupler 40. Then, the optical fiber 10 outputs lightwaves including the idler lightwave of wavelength $\lambda_i$ that is generated with the FWM process. Of lightwaves output from the optical fiber 10, a lightwave of wavelength $\lambda_i$ is selectively allowed to pass through the bandpass filter 41 and output therefrom. It is unnecessary to provide the bandpass filter 41 in the case where it is not needed to selectively take out only the idler lightwave of wavelength $\lambda_i$, that is, in the case where the mixed state including the pump lightwave and the signal lightwave is allowable.

Figure 2:
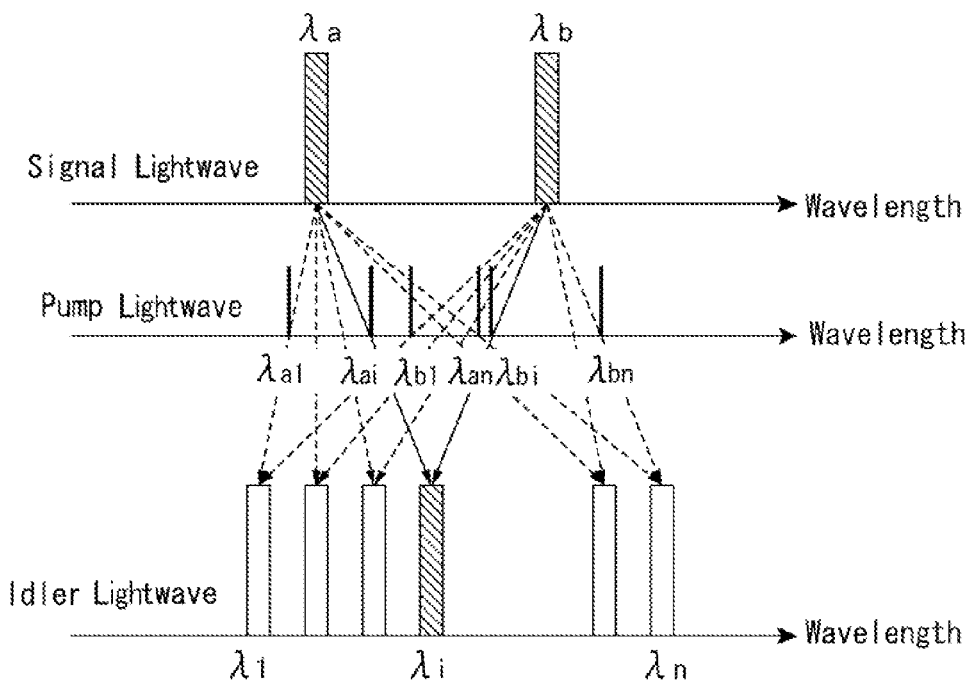
FIG. 2 is a conceptional schematic diagram for illustrating the wavelength conversion function of the fiber optic device.

FIG. 2 is a conceptional schematic diagram for illustrating the wavelength conversion function of the fiber optic device. As for the fiber optic device 1, it is desired that an idler lightwave of optional wavelength $\lambda_i$ (i=1, 2 . . . n) can be output even if lightwaves having a wavelength $\lambda_a$ and a wavelength $\lambda_b$ which are different from each other are input as signal lightwaves. That is, it is desired to output an idler lightwave having an optional wavelength from a signal lightwave having an arbitrary wavelength and having been input into the fiber optic device 1.

Now, the contents of the studies on the theory that leads to the present invention will be explained. Here, assume the case where pump lightwaves (wavelengths: $\lambda_{p1}$, $\lambda_{p2}$) and a signal lightwave (wavelength: $\lambda_s$) are incident on an optical fiber for performing wavelength conversion, and FWM occurs in the optical fiber, thereby generating an idler lightwave having a new wavelength $\lambda_i$. In such case, the wavelength $\lambda_{p1}$ and the wavelength $\lambda_{p2}$ may be equal to each other, in which case these wavelengths are represented by $\lambda_p$.

The wavelength $\lambda_i$ of an idler lightwave obtained by the wavelength conversion through the optical fiber is expressed by formula (1), using the wavelengths $\lambda_{p1}$, $\lambda_{p2}$ of the pump lightwave and the wavelength $\lambda_s$ of the signal lightwave:

$$\lambda_i = (\lambda_{p1}^{-1} + \lambda_{p2}^{-1} - \lambda_s^{-1})^{-1} \quad (1)$$

The respective waves of a pump lightwave, a signal lightwave, and an idler lightwave must satisfy the phase matching condition. The phase mismatching parameter $\Delta\beta$ is expressed by formula (2), where optical phases of pump lightwaves (wavelengths: $\lambda_{p1}$, $\lambda_{p2}$), a signal lightwave (wavelength: $\lambda_s$), and an idler lightwave (wavelength: $\lambda_i$) are represented by $\beta_{p1}$, $\beta_{p2}$, $\beta_s$, and $\beta_i$, respectively:

$$\Delta\beta = (\beta_{p1} + \beta_{p2} - \beta_s - \beta_i) \quad (2)$$

The phase shift $\phi$ due to the self phase modulation is expressed by formula (3):

$$\phi = -\gamma \times (p1 + p2) \quad (3)$$

where the input power of the pump lightwaves having wavelengths of $\lambda_{p1}$ and $\lambda_{p2}$ which are incident on the optical fiber are represented by p1 and p2, respectively. And, the sum $\kappa$ of the phase mismatching parameter $\Delta\beta$ and the phase shift $\phi$ is expressed by formula (4):

$$\kappa = \Delta\beta - \gamma \times (p1 + p2) \quad (4)$$

When the sum $\kappa$ is 0, the wavelength conversion efficiency E, which is the ratio of output power $P_i$ of the idler lightwave from the optical fiber relative to the input power $P_s$ of the signal lightwave incident on the optical fiber, becomes maximum.

The wavelength conversion efficiency E is expressed by formula (5), where d is a coefficient showing the degeneracy, $\alpha$ is an attenuation of the optical fiber, $L_{eff}(=\{1-\exp(-\alpha L)\}/\alpha)$ is an effective length of the optical fiber, L is a length of the optical fiber, and $\eta$ is a phase-matching parameter:

$$E = d \cdot p1 \cdot p2 \times (\gamma \cdot Leff)^2 \exp(-\alpha \cdot L) \cdot \eta \quad (5)$$

The phase-matching parameter $\eta$ is obtained by formula (6):

$$\eta = \frac{1}{\alpha^2 + \kappa^2} \left( \alpha^2 + \frac{4\exp(-\alpha \cdot L) \cdot \sin^2(\kappa \cdot L/2)}{Leff^2} \right) \quad (6)$$

Here, $\eta$ becomes maximum 1 when $\kappa = 0$. When the attenuation is low as in the case of a silica-based optical fiber, the formula (6) is approximated by formula (7):

$$\eta \approx \left( \frac{\sin(\kappa \cdot L/2)}{\kappa \cdot L/2} \right)^2 \quad (7)$$

Here, when the pump lightwave is an identical wavelength $\lambda_p$, the formula (1) becomes formula (8):

$$\lambda_i = (2\lambda_p^{-1} - \lambda_s^{-1})^{-1} \quad (8)$$

The wavelength $\lambda_p$ of the pump lightwave can be calculated as $2 \times (\lambda_s^{-1} + \lambda_i^{-1})^{-1}$ from the formula (8) when the wavelength $\lambda_s$ of the signal lightwave and the wavelength $\lambda_i$ of the idler lightwave are determined. Also, by using second order dispersion $\beta_{2p}$ at wavelength $\lambda_p$, the phase mismatching parameter $\Delta\beta$ can be approximated with formula (9):

$$\Delta\beta = -4\beta_{2p} \times [\pi \cdot C \cdot (\lambda_p^{-1} - \lambda_s^{-1})]^2 \quad (9)$$

In the formula (9), C is light velocity in the vacuum.

Here, in the case where the input power P of the pump lightwave is sufficiently small and no phase shift occurs, $\kappa \sim \Delta\beta$ holds true, and therefore the conversion efficiency E becomes maximum if the second order dispersion $\beta_{2p}$ at the wavelength $\lambda_p$ of pump lightwave is zero, that is, if the wavelength of the pump lightwave is coincident with the zero dispersion wavelength of the optical fiber 10. It is known that the relationship between the second order dispersion $\beta_2$ and the chromatic dispersion D of an optical fiber generally satisfies formula (10):

$$\beta_2 = -\lambda^2/(2\pi \cdot C) \times D \quad (10)$$

Here, we will discuss a case where a signal lightwave in the C-band (wavelength: 1530 to 1565 nm) is converted to an idler lightwave in the C-band by wavelength conversion using the fiber optic device 1. The second order dispersion $\beta_{2p}$ can be expressed by formula (11) using a third order dispersion $\beta_3$ at the zero dispersion wavelength $\lambda_z$:

$$\beta_{2p} = \beta_3 \cdot 2\pi \cdot C(\lambda_p^{-1} - \lambda_z^{-1}) \quad (11)$$

Here, the relationship between the third order dispersion $\beta_3$ and the dispersion slope S is expressed by formula (12):

$$\beta_3 = -\lambda^3/(2\pi \cdot C)^2 \times (2D + \lambda S) \quad (12)$$

In the formula (12), since the chromatic dispersion D at the zero dispersion wavelength $\lambda_z$ is zero, the relationship of "$\beta_3$ [ps$^3$/km]~1.6 [ps$^2$ nm$^2$]×S [ps/nm$^2$/km]" is satisfied when the wavelength $\lambda$ is around 1.55 μm. The formula (9) can be rewritten as formula (13) when the formula (11) is applied to the formula (9).

$$\Delta\beta = -8\pi^3 C^3 \beta_3 \times (\lambda_p^{-1} - \lambda_z^{-1}) \times (\lambda_p^{-1} - \lambda_s^{-1})^2 \quad (13)$$

The formula (13) shows that as the value of $(\lambda_p^{-1} - \lambda_z^{-1}) \times (\lambda_p^{-1} - \lambda_s^{-1})^2$ decreases, the phase mismatching parameter $\Delta\beta$ becomes smaller.

Figure 3:
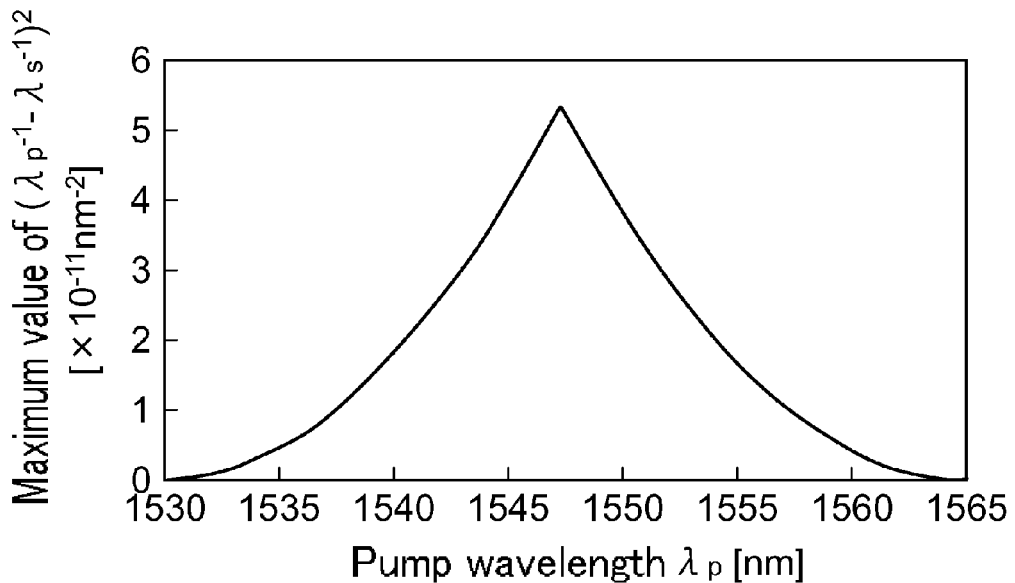
FIG. 3 is a graph showing the relationship between a pump wavelength and the maximum of $(\lambda_p^{-1}-\lambda_s^{-1})^2$.
Figure 4:
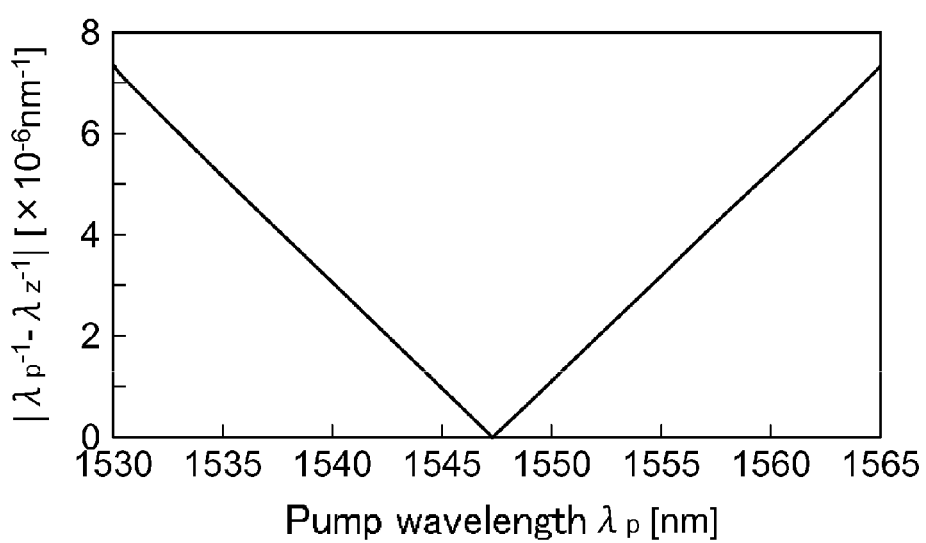
FIG. 4 is a graph showing the relationship between a pump wavelength and $(\lambda_p^{-1}-\lambda_z^{-1})$.

FIG. 3 is a graph showing the relationship between a pump wavelength $\lambda_p$ and the maximum of $(\lambda_p^{-1} - \lambda_s^{-1})^2$. The maximum of $(\lambda_p^{-1} - \lambda_s^{-1})^2$ becomes $(1530^{-1} - \lambda_p^{-1})^2$ when $\lambda_p$ is 1530 to 1547.3 nm, and also becomes $(1565^{-1} - \lambda_p^{-1})^2$ when $\lambda_p$ is 1547.3 to 1565 nm, where the boundary of 1547.3 nm is calculated from $2 \times (\lambda_x^{-1} + \lambda_y^{-1})^{-1}$ using wavelength $\lambda_x = 1530$ nm and wavelength $\lambda_y = 1565$ nm, which are wavelengths edges of the C-band. The maximum of $(\lambda_p^{-1} - \lambda_s^{-1})^2$ becomes the largest when the pump wavelength $\lambda_p$ is around 1547.3 nm, and therefore, in order to decrease the phase mismatching parameter $\Delta\beta$, it is sufficient if $(\lambda_p^{-1} - \lambda_z^{-1})$ becomes smaller when the pump wavelength $\lambda_p$ is around 1547.3 nm. That is, the zero dispersion wavelength $\lambda_z$ is preferably 1547.3 nm. FIG. 4 is a graph showing the relationship between a pump wavelength $\lambda_p$ and $(\lambda_p^{-1} - \lambda_z^{-1})$ in the case where the zero dispersion wavelength $\lambda_z$ is 1547.3 nm.

Figure 9:
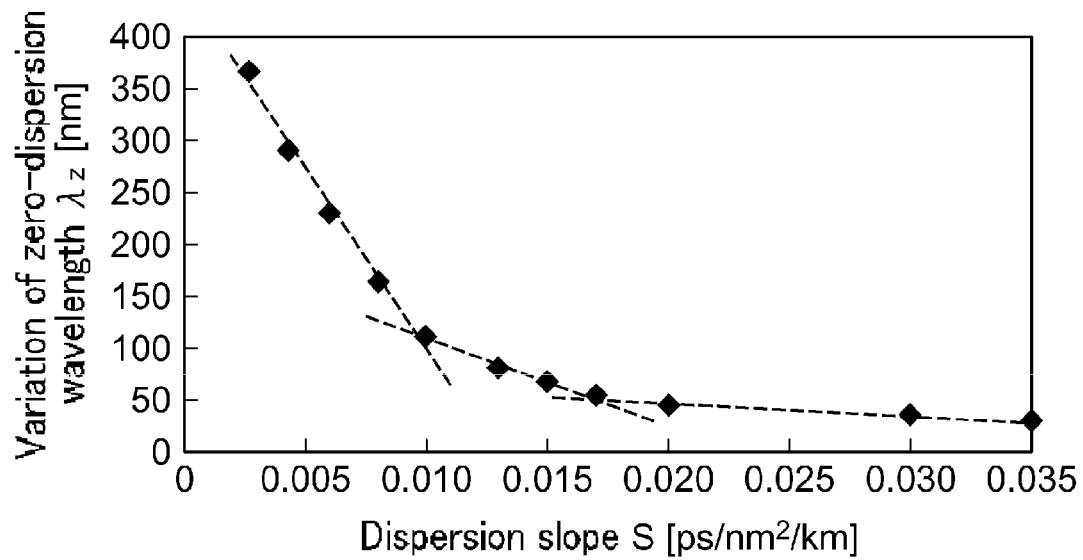
FIG. 9 is a graph showing the relationship between a dispersion slope and a variation of zero-dispersion wavelength in the case where the core diameter of an optical fiber is changed by 1%.

According to formula (13), the smaller the third order dispersion $\beta_3$ which has an influence on the dispersion slope S, the better. However, when taking limitation of manufacturing accuracy into consideration, the preferable range of the third order dispersion $\beta_3$ and the dispersion slope S is limited to a certain lower limit. FIG. 9 is a graph showing the relationship between a dispersion slope S and the variation of the zero-dispersion wavelength $\lambda_z$ in the case where the core diameter of an optical fiber is changed by 1%. When the dispersion slope S is smaller than +0.01 ps/nm$^2$/km, the variation of zero dispersion wavelength $\lambda_z$ due to limitation of manufacturing accuracy become too large. Therefore, it is preferable that the dispersion slope S of the optical fiber 10 be +0.01 ps/nm$^2$/km or more (the third order dispersion $\beta_3$ is around +0.016 ps$^3$/km or more). Also, the optical fiber 10 is preferably an optical fiber (particularly DS-HNLF) having a dispersion slope S that is greater than +0.017 ps/nm$^2$/km.

Figure 5:
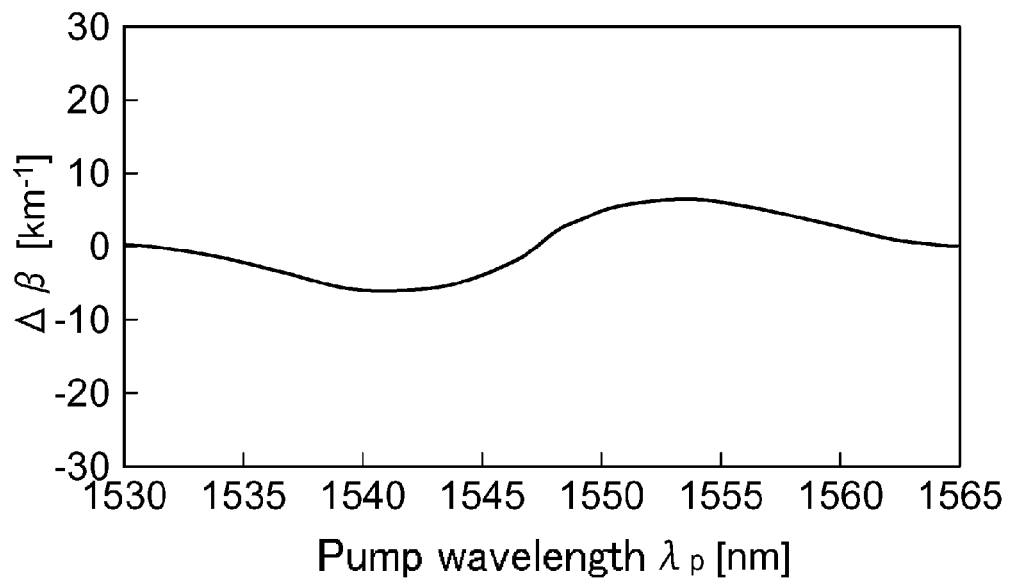
FIG. 5 is a graph showing the relationship between a wavelength of pump lightwave and a phase-mismatching parameter $\Delta\beta$ in an example of dispersion-shifted highly nonlinear fiber.
Figure 6:
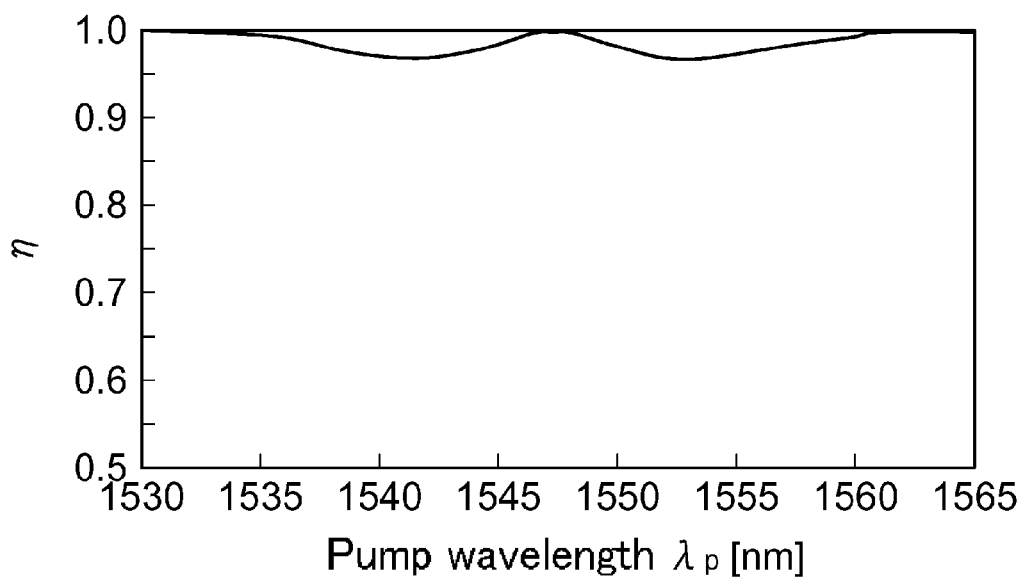
FIG. 6 is a graph showing the relationship between a wavelength of pump lightwave and a phase-matching parameter η in an example of dispersion-shifted highly nonlinear fiber.

FIG. 5 is a graph showing the relationship between a pump wavelength $\lambda_p$ and a phase mismatching parameter $\Delta\beta$ calculated from the formula (13) in the case where the optical fiber 10 is a dispersion-shifted highly nonlinear fiber (DS-HNLF) in which the third order dispersion $\beta_3$ is +0.016 ps$^3$/km and the zero dispersion wavelength $\lambda_z$ is 1547.3 nm. FIG. 6 is a graph showing the relationship between a pump wavelength $\lambda_p$ and a phase-matching parameter η calculated from the formula (7) in the case where the optical fiber 10 has a length of 100 m. As shown in FIG. 6, at any wavelength where the pump wavelength $\lambda_p$ is within the C-band, the phase-matching parameter η is within the range of 0.97 to 1.0. Also, in the conversion efficiency E that is calculated with the formula (5), the values other than the phase-matching parameter η do not depend on the wavelength. Therefore, when a signal lightwave in the C-band is converted to an idler lightwave in the C-band by the wavelength conversion, the minimum value of the conversion efficiency E that is normalized by defining the maximum conversion efficiency as 1 is 0.97 (0.14 dB), and thus the variation is restrained to 0.03, enabling high conversion efficiency.

Figure 7:
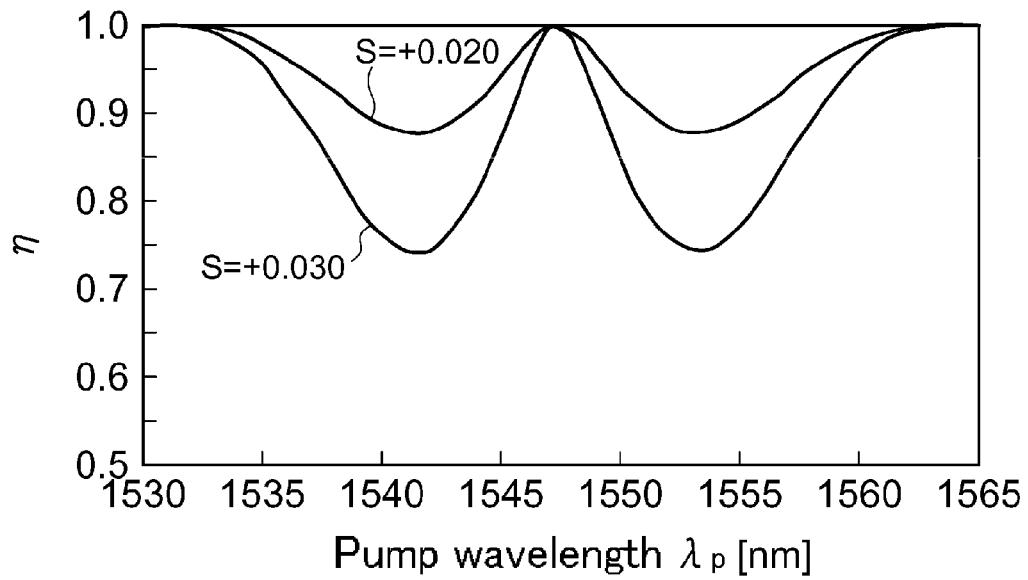
FIG. 7 is a graph showing the relationship between a wavelength of pump lightwave and a phase-matching parameter in an example of dispersion-shifted highly nonlinear fibers having a dispersion slope of +0.020 and +0.030 ps/nm²/km, respectively, at a zero-dispersion wavelength.
Figure 8:
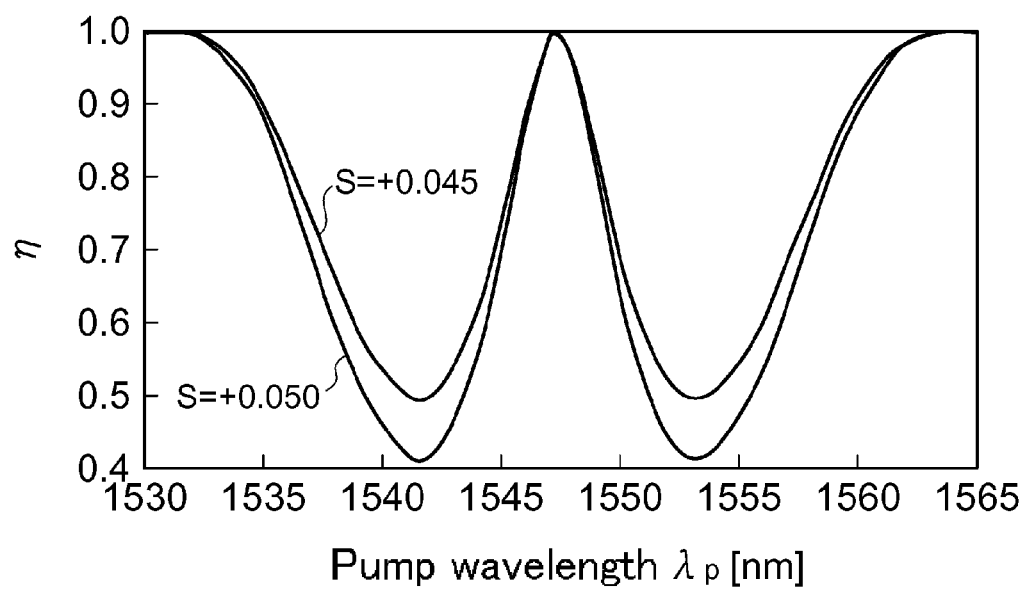
FIG. 8 is a graph showing the relationship between a wavelength of pump lightwave and a phase-matching parameter in an example of dispersion-shifted highly nonlinear fibers having a dispersion slope of +0.045 and +0.050 ps/nm²/km, respectively, at a zero-dispersion wavelength.

FIG. 7 is a graph showing the relationship between a pump wavelength $\lambda_p$ and phase-matching parameters η in the case where the optical fibers 10 are two kinds of DS-HNLFs each having a length of 100 m and a zero dispersion wavelength $\lambda_z$ of 1547.3 nm, and the dispersion slope thereof at the zero-dispersion wavelength $\lambda_z$ are +0.020 and +0.030 ps/nm$^2$/km, respectively. FIG. 8 is a graph showing the relationship between a pump wavelength $\lambda_p$ and a phase-matching parameter η in the case where the optical fibers 10 are two kinds of DS-HNLFs each having a length of 100 m and a zero dispersion wavelength $\lambda_z$ of 1547.3 nm, and the dispersion slope thereof at the zero-dispersion wavelength $\lambda_z$ are +0.045 and +0.050 ps/nm$^2$/km, respectively. When DS-HNLFs having a dispersion slope S of +0.045 ps/nm$^2$/km or less are used as the optical fiber 10, the normalized conversion efficiency E as determined by defining the maximum wavelength conversion efficiency as 1 becomes 0.5 (−3 dB) or more, enabling high conversion efficiency.

According to the formula (7), the shorter the fiber length L, the smaller κ·L becomes, and hence the variation of the conversion efficiency E decreases. However, according to the formula (5), it is not preferable to make the fiber length L shorter because the value of conversion efficiency E decreases as the fiber length L is made shorter. The conversion efficiency E is preferably −20 dB or more, for example. If the optical fiber 10 has a nonlinear coefficient γ of 20/W/km, which is general as a DS-HNLF, and if the input power of pump lightwave is 200 mW, which is easily available, then the fiber length L that is needed is 25 m or more according to the formula (7). If the fiber length L is 75 m or longer, the conversion efficiency E will become equal to or more than −10 dB, which is more preferable.

Figure 10:
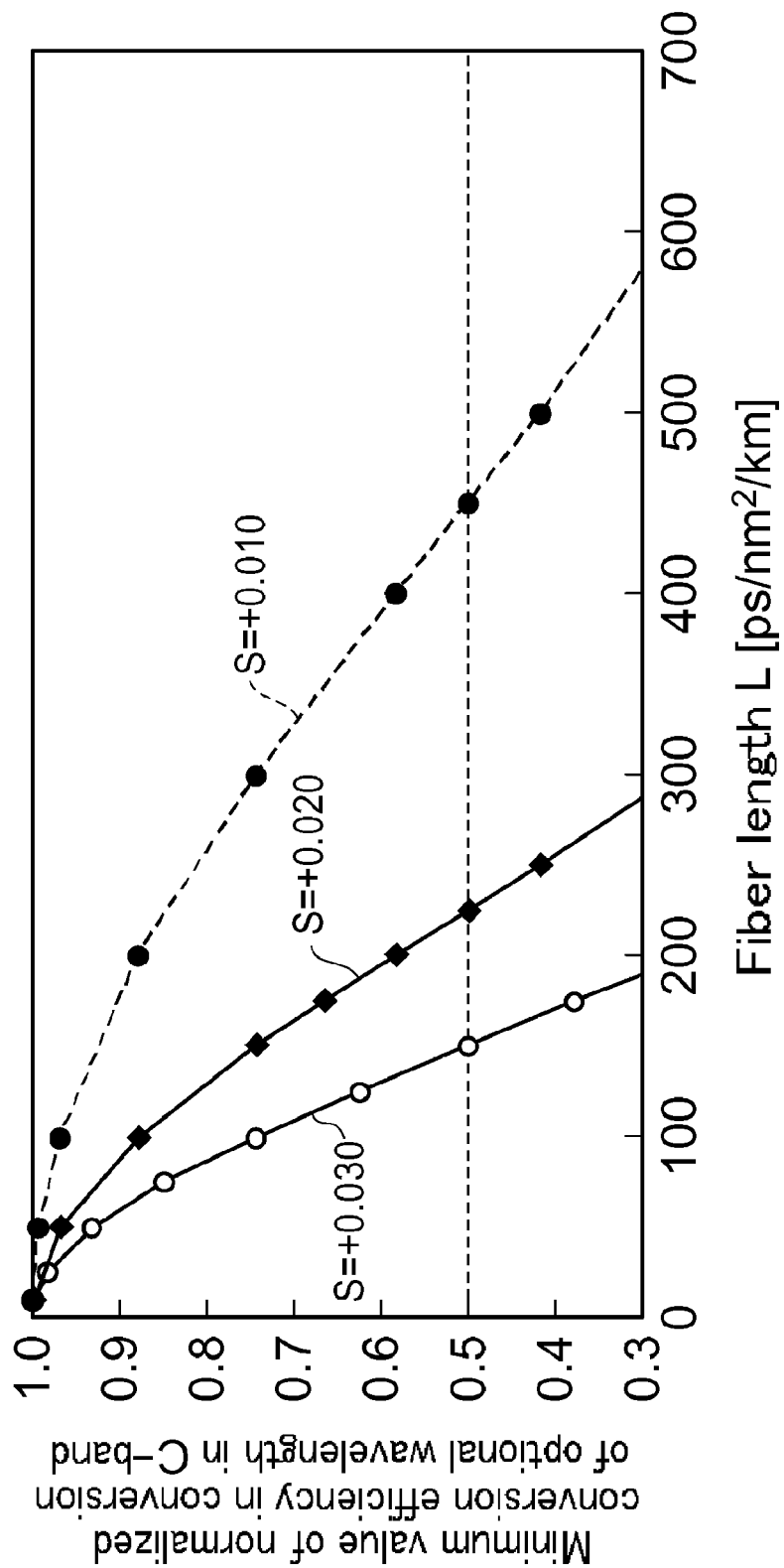
FIG. 10 is a graph showing the relationship between a fiber length and a minimum value of normalized conversion efficiency in an example of dispersion-shifted highly nonlinear fibers having a dispersion slope of +0.010, +0.020, and +0.030 ps/nm2/km, respectively, at a zero-dispersion wavelength.

On the other hand, if the fiber length is longer, κ·L becomes larger, and the variation of the conversion efficiency E increases. FIG. 10 is a graph showing the relationship between a fiber length L and a minimum value of relative conversion efficiency normalized by defining the maximum value of conversion efficiency as 1, in the case where a signal lightwave in the C-band is converted to an idler lightwave in the C-band by wavelength conversion and the optical fibers 10 are three DS-HNLFs each of which has a zero dispersion wavelength $\lambda_z$ of 1547.3 nm and which have a dispersion slope S of +0.010, +0.020, and +0.030 ps/nm$^2$/km, respectively, at the zero-dispersion wavelength $\lambda_z$. The fiber length L with which the minimum value of the relative conversion efficiency becomes 0.5 were 450 m, 220 m, and 150 m, respectively, and thus the smaller the dispersion slope S, the smaller the variation of the conversion efficiency, even when the fiber length was longer. Since the preferable range of the dispersion slope S is +0.01 ps/nm$^2$/km or more, the fiber length of the optical fiber 10 is preferably 450 m or less. For example, the fiber length L is preferably 220 m or less, and more preferably 150 m or less.

Figure 11:
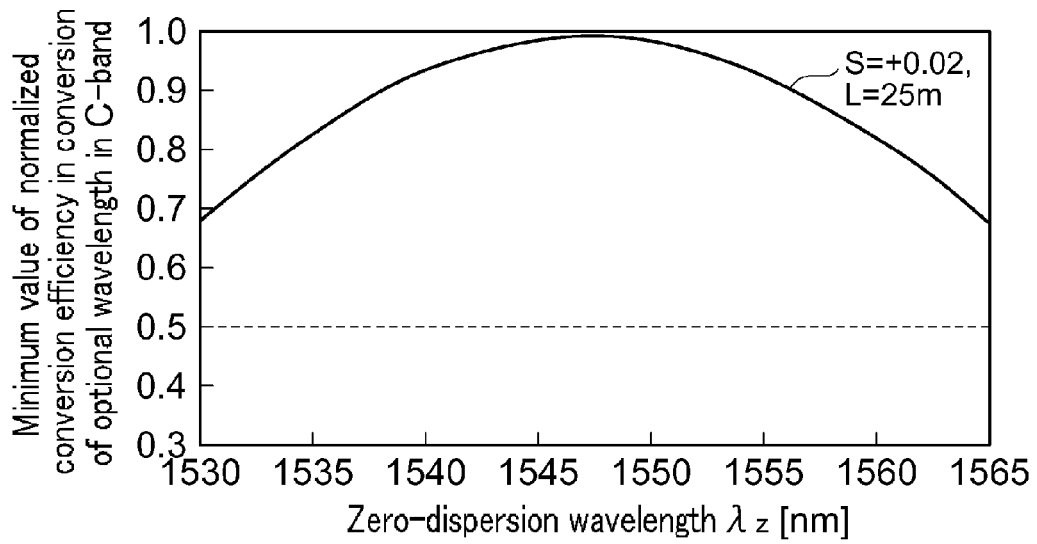
FIG. 11 is a graph showing the relationship between a zero dispersion wavelength and a minimum value of normalized conversion efficiency in an example of a dispersion-shifted highly nonlinear fiber having a length of 25 m and having a dispersion slope of +0.020 ps/nm²/km at the zero-dispersion wavelength.

FIG. 11 is a graph showing the relationship between a zero dispersion wavelength $\lambda_z$ and a minimum value of relative conversion efficiency normalized by defining the maximum value of conversion efficiency E as 1 in the case where the optical fiber of 25 m in length has a dispersion slope of +0.020 ps/nm$^2$/km, and a signal lightwave in the C-band (wavelength band: 35 nm) is converted to an idler lightwave in the C-band by wavelength conversion. Since the relative conversion efficiency is 0.5 (3 dB) or higher when the zero dispersion wavelength $\lambda_z$ is within the C-band, it was confirmed that regardless of combination between a signal wavelength and an idler wavelength, the wavelength conversion can be achieved at high conversion efficiency with less variation when a signal lightwave having an arbitrary wavelength within a first wavelength band of 30 nm or more is converted to an idler lightwave having an arbitrary wavelength within a second wavelength band of 30 nm or more.

Figure 12:
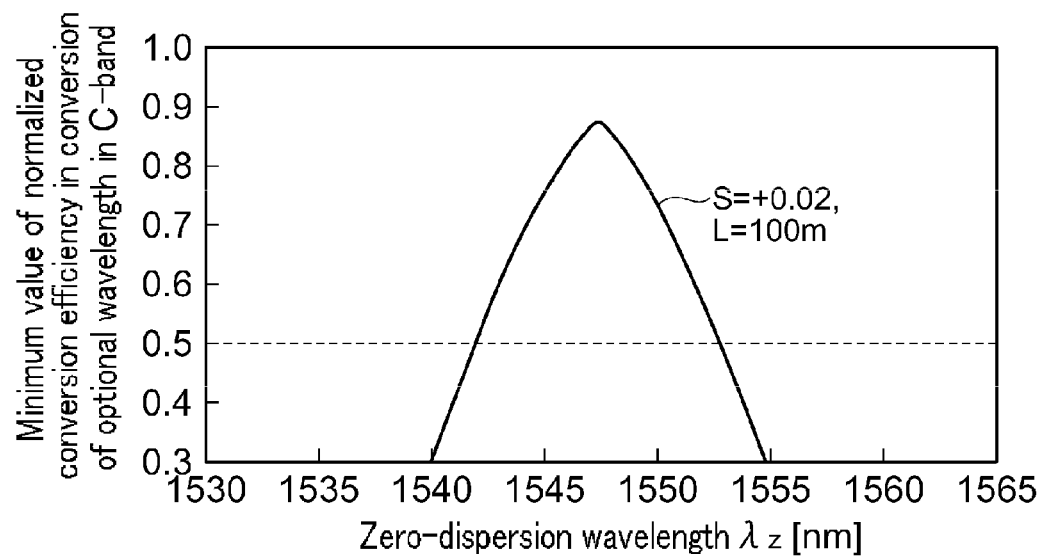
FIG. 12 is a graph showing the relationship between a zero dispersion wavelength and the minimum value of the normalized conversion efficiency in an example of a dispersion-shifted highly nonlinear fiber of 100 m in length having a dispersion slope of +0.020 ps/nm²/km at the zero-dispersion wavelength.

FIG. 12 is a graph showing the relationship between a zero dispersion wavelength $\lambda_z$ and a minimum value of relative conversion efficiency normalized by defining the maximum value of conversion efficiency E as 1 in the case where the optical fiber of 100 m in length has a dispersion slope of +0.020 ps/nm$^2$/km, and a signal lightwave in the C-band is converted to an idler lightwave in the C-band by wavelength conversion. In this case, the zero dispersion wavelength $\lambda_z$ that enables achieving higher conversion efficiency with less variation (the relative conversion efficiency E is 0.5 (3 dB) or higher) regardless of the combination of a signal wavelength and an idler wavelength in the C-band is 1547.3 nm±6 nm. Therefore, it is preferable to use an optical fiber whose zero dispersion wavelength $\lambda_z$ is in this range, i.e., $2 \times (\lambda_x^{-1} + \lambda_y^{-1})^{-1} \pm 6$ nm.

Moreover, when choosing an optical fiber 10, it is necessary to consider the power of the pump lightwave that is input into the optical fiber 10 and the phase shift due to phase modulation as shown in the formula (4). For example, when the nonlinear coefficient γ is 20/W/km and the input power of the pump lightwave is 200 mW, the phase shifts −8/km. Here, in the case where the dispersion slope S is +0.020 ps/nm$^2$/km, the sum κ becomes zero at the pump light wavelength of 1547.3 nm that is the center of the C-band, if the zero dispersion wavelength $\lambda_z$ is 1545.6 nm.

In order to realize the sum κ becomes zero when the pump wavelength is at the central wavelength of the C-band, the zero dispersion wavelength $\lambda_z$ should shift to a shorter wavelength as the dispersion slope S is smaller. For example, when the dispersion slope S is +0.010 ps/nm$^2$/km, the zero dispersion wavelength $\lambda_z$ should be 1544 nm, and when the dispersion slope S is +0.030 ps/nm$^2$/km, the zero dispersion wavelength $\lambda_z$ should be 1546.2 nm. Thus, if the power of the pump lightwave that is incident on the optical fiber 10 is strong, it is possible to use an optical fiber having a zero dispersion wavelength $\lambda_z$ which is several nm shorter than the central wavelength of the band (here, 1547.3 nm that is the central wavelength of the C-band) can be used as the optical fiber 10.

Also, it is preferable that the nonlinear coefficient γ of the optical fiber 10 be large. In a linear polarization state, the nonlinear coefficient γ is preferably equal to or more than 15/W/km which is 10 times the nonlinear coefficient of a standard single mode fiber. If the nonlinear coefficient is 10 times, it is possible to obtain a conversion efficiency that is 100 times as large as the conversion efficiency of a standard single mode fiber since the conversion efficiency E is proportional to the square of the nonlinear coefficient γ. Thus, more preferably, the nonlinear coefficient γ is 20/W/km or more.

Also, the smaller the polarization mode dispersion (PMD) of the optical fiber 10, the more preferable. More specifically, it is preferable that the PMD of the optical fiber 10 in a length of actual use be 0.2 ps or less. A polarization maintaining optical fiber can also be used.

Also, the lower the attenuation of the optical fiber 10, the better. However, in a fiber optic device 1, the fiber length L of the optical fiber 10 is tens or hundreds of meters, and hence the fiber having the attenuation of 10 dB/km or less can be applied for practical use.

As described above, with the fiber optic device 1 it is possible to reduce the variation of the zero dispersion wavelength $\lambda_z$ in the manufacture thereof and also to enhance the conversion efficiency E since the zero dispersion wavelength $\lambda_z$ and the dispersion slope S of the optical fiber 10 are within the above-mentioned range. Accordingly, by making the fiber length L of the optical fiber to be 450 m or less, the variation of the conversion efficiency E can be decreased while it is maintained at high level, and hence it is made possible to enhance the conversion efficiency E when a signal lightwave of an arbitrary wavelength included in the C-band (the first wavelength band) is converted into an idler lightwave having an optional wavelength included in the second wavelength band.

A modified example of fiber optic device 1 may be such that the optical amplifier 22 for amplifying the pump lightwave is provided with a high-speed gain controller. In this case, the conversion efficiency E of the idler lightwave that is output from the optical fiber 10 is proportional to the square of input power of the pump lightwave that is input to the optical fiber 10, and therefore it becomes possible to control the output power of the idler lightwave by changing the input power of the pump lightwave with the gain controller.

As another modified example, an optical amplifier may be provided downstream of the optical fiber 10. Naturally, the optical amplifier may be provided either upstream or downstream of the bandpass filter 41 that is arranged downstream of the optical fiber 10.

Figure 13:
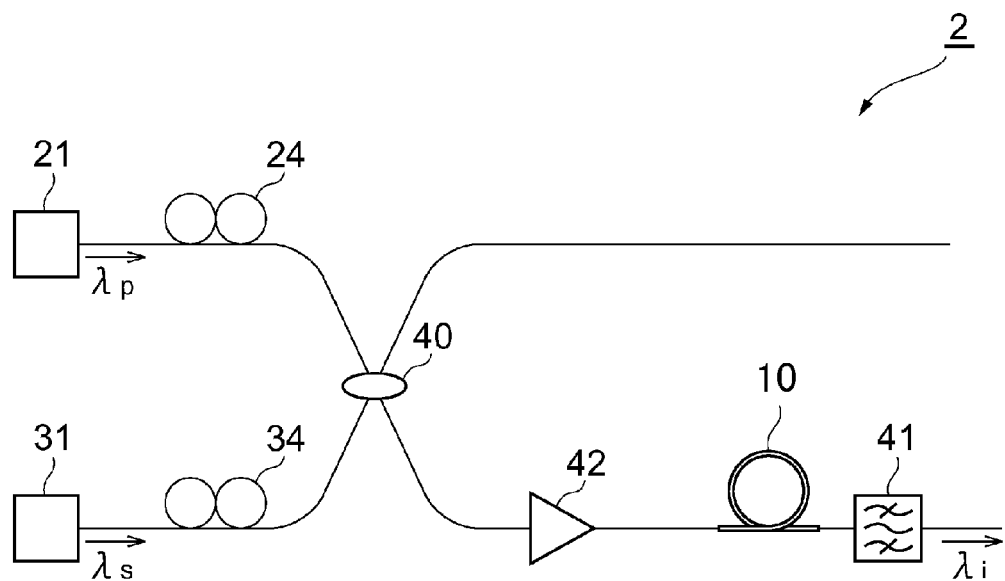
FIG. 13 is a conceptional schematic diagram of a fiber optic device according to Embodiment 2 of the present invention.

FIG. 13 is a conceptional schematic diagram of a fiber optic device 2 according to Embodiment 2 of the present invention. The fiber optic device 2 does not have the optical amplifier 22 and the bandpass filter 23, which are provided between the pump light source 21 and the polarization controller 24 in the case of the fiber optic device 1, and has an optical amplifier 42 between the optical coupler 40 and the optical fiber 10. An optical amplifier which exhibits a constant gain in a specific band (e.g., gain-flattened EDFA) is preferable as the optical amplifier 42. By using the optical amplifier 42, the pump lightwave and the signal lightwave which are combined by the optical coupler 40 are amplified at the same gain, and thereafter they are input into the optical fiber 10. As in the case of using the fiber optic device 1, high conversion efficiency can be obtained by using the fiber optic device 2 for achieving wavelength conversion of a lightwave having an arbitrary wavelength in a specific wavelength band.

Figure 14:
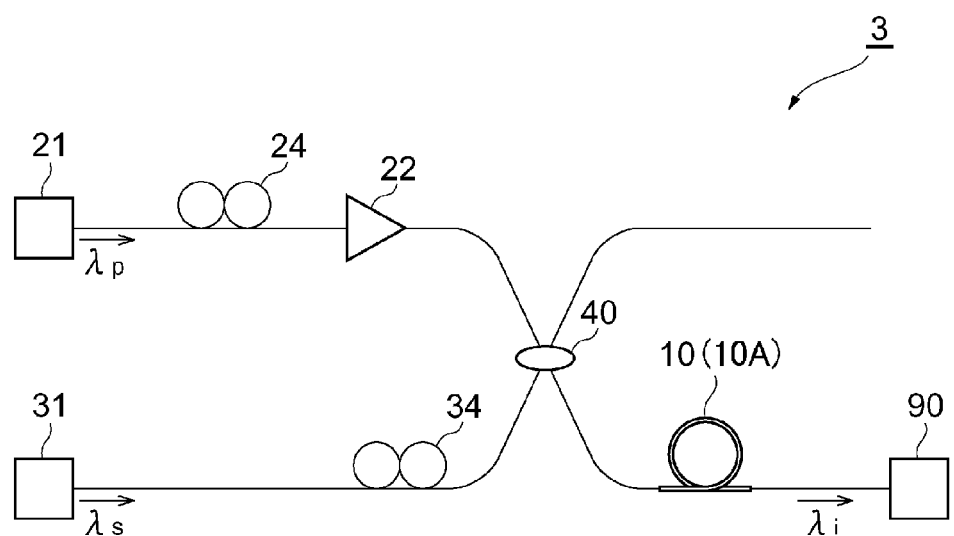
FIG. 14 is a conceptional schematic diagram of a fiber optic device according to Embodiment 3 of the present invention.

FIG. 14 is a conceptional schematic diagram of a fiber optic device according to Embodiment 3 of the present invention. As compared with the fiber optic device 1, the fiber optic device 3 is such that the bandpass filter 23 on the optical path of the pump light source 21 is removed, and the arrangement of the optical amplifier 22 and the polarization controller 24 is replaced, and the bandpass filter 41 downstream of the optical fiber 10 (optical fiber 10A in the Embodiment 3) is removed.

An EDFA was used as the optical amplifier 22. Also, a DS-NHLF having a length of 100 m and characteristic values shown in the table was used as the optical fiber 10A.

TABLE

|  | Optical fiber 10A | Optical fiber 10B | Optical fiber 11A |
|---|---|---|---|
| Zero dispersion wavelength $\lambda_z$ [nm] | 1548.8 | 1546.2 | 1566.0 |
| Dispersion slope S at $\lambda_z$ [ps/nm²/km] | +0.020 | +0.015 | +0.024 |
| Attenuation α [dB/km] | 0.9 | 0.9 | 0.6 |
| PMD [ps] | 0.01 | 0.02 | 0.02 |
| Effective area Aeff [μm²] | 8.5 | 9.4 | 13 |
| Nonlinear coefficient γ [/W/km] | 30 | 25 | 15 |

The nonlinear coefficient γ is a value measured using a cross-phase modulation (XPM) method in the linear polarization state. It is known that the effective nonlinear coefficient γ in the case where the polarization state is random becomes ⅔ of the nonlinear coefficient available in the linear polarization state.

Figure 15:
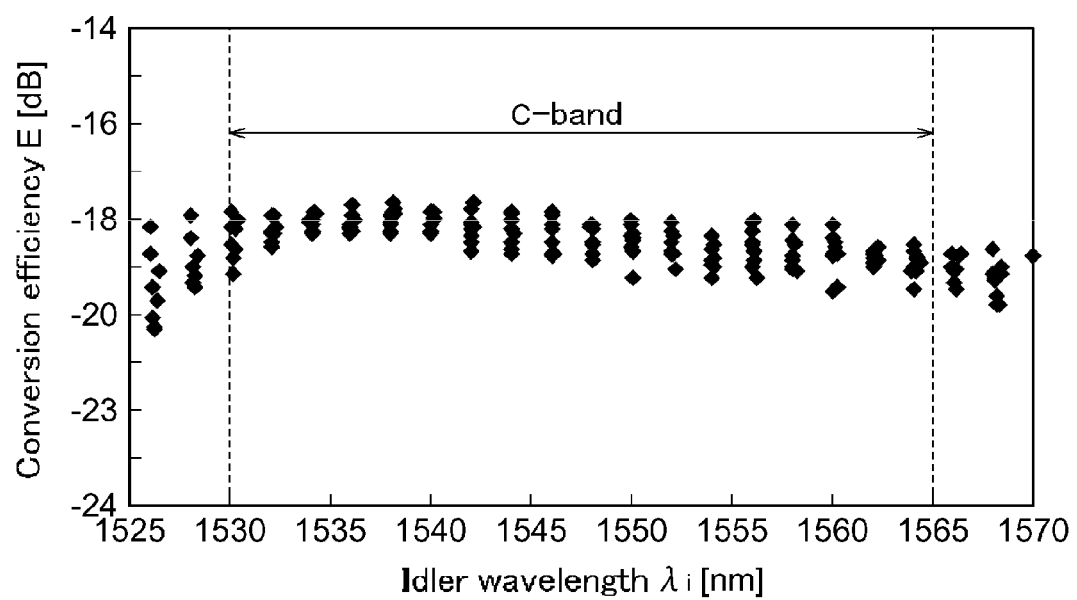
FIG. 15 is a graph showing the relationship between the wavelength of idler lightwave and the conversion efficiency when the pump wavelength is changed in the fiber optic device relating to Embodiment 3.

FIG. 15 is a graph showing the relationship between the conversion efficiency E and the wavelength $\lambda_i$ of an idler lightwave in the case where the pump wavelength $\lambda_p$ is changed in the fiber optic device 3. After the pump lightwave and the signal lightwave which were amplified by the optical amplifier 22 were combined by the optical coupler 40, and then the pump lightwave and the signal lightwave were made incident on the optical fiber 10A at the power of 50 mW (+17 dBm) and 1 mW (0 dBm), respectively. And, the wavelength and the power of an idler lightwave emitted from the optical fiber 10A were measured with a spectral analyzer 90. In this measurement, wavelengths of 1530, 1532 . . . 1564, 1566 nm were used as signal lightwaves, and the wavelength $\lambda_i$ of the idler lightwave was adjusted by changing the wavelengths $\lambda_p$ of the pump lightwave relative to the respective wavelengths of the signal lightwaves according to equation (8). It was confirmed that the variation of the conversion efficiency E in the case where the signal lightwave in the C-band was converted into an idler lightwave having an optional wavelength in the C-band was within 1.5 dB. Thus, it was shown that with the fiber optic device 3 the wavelength conversion from a lightwave having an arbitrary wavelength in the C-band to an idler lightwave having an optional wavelength in the C-band could be performed at high conversion efficiency.

The fiber optic device of the present invention can be applied to a lightwave in a wavelength band other than C-band. For example, it is possible to convert an arbitrary wavelength in the 1570 to 1605 nm band (which is called the practical L-band in this specification) to an idler lightwave having an optional wavelength in the practical L-band.

In such case, preferably the zero dispersion wavelength $\lambda_z$ of the optical fiber 10A is around $2\times(1570^{-1}+1605^{-1})^{-1}=1587.3$ nm which is calculated using wavelengths of 1570 nm and 1605 nm, which are the edges of the practical L-band. In the case where the fiber length L is as short as tens of meters, it is possible to achieve wavelength conversion with an optional wavelength at high conversion efficiency if the zero dispersion wavelength $\lambda_z$ is a wavelength within the practical L-band. However, in the case where the fiber length L is about 100 m, it is preferable that in order to enhance the conversion efficiency the zero dispersion wavelength $\lambda_z$ be 1587.3±6 nm. In the case where the power of input lightwave is tens of mW or more, preferably the zero dispersion wavelength $\lambda_z$ is about 1577.3 nm to 1592.3 nm.

In the wavelength conversion with fiber optic devices 1 to 3, the spectrum of the idler lightwave is inversed to the spectrum of the signal lightwave. If such inversion causes a problem, it will be sufficient to arrange two lengths of optical fibers for wavelength conversion in series so as to implement the wavelength conversion of a signal lightwave twice. For example, a lightwave having an arbitrary wavelength $\lambda_1$ in the C-band may be converted to a lightwave of wavelength $\lambda_2$ in the C-band by the first wavelength conversion, and thereafter the lightwave of wavelength $\lambda_2$ may be converted to a lightwave of an optional wavelength $\lambda_3$ in the C-band by the second wavelength conversion. Also, an alternative embodiment may be such that by the first wavelength conversion a lightwave having an arbitrary wavelength in the C-band is converted to a lightwave having a wavelength outside of the C-band, which lightwave is converted to a lightwave having a different wavelength in the C-band by the second wavelength conversion.

The following is an explanation on a case in which a signal lightwave and an idler lightwave are respectively included in wavelength bands which are different from each other. For examples, there is a case where a lightwave having an arbitrary wavelength in the C-band is converted to a lightwave having an optional wavelength in the practical L-band, or a case where a lightwave having an arbitrary wavelength in the practical L-band is converted to a lightwave having an optional wavelength in the C-band.

Figure 16:
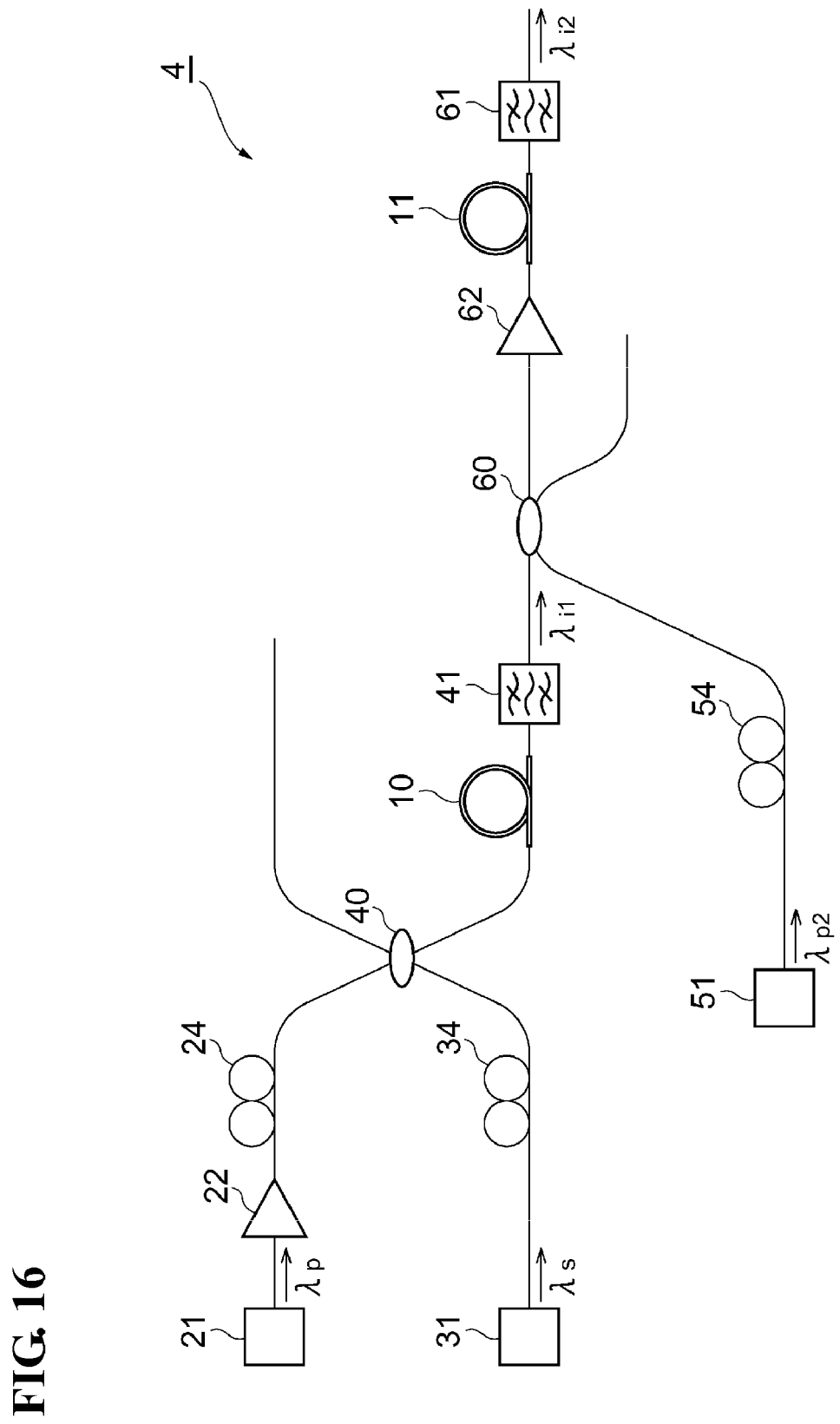
FIG. 16 is a conceptional schematic diagram of a fiber optic device according to Embodiment 4 of the present invention.

FIG. 16 is a conceptional schematic diagram of a fiber optic device according to Embodiment 4 of the present invention. A fiber optic device 4 is such that an optical fiber for performing wavelength conversion is further provided at a downstream part of the fiber optic device 1, so that it converts, without the above-mentioned spectrum inversion, a lightwave having an arbitrary wavelength in the C-band to a lightwave having an optional wavelength in the practical L-band.

More specifically, the signal lightwave of wavelength $\lambda_s$ and the pump lightwave of wavelength $\lambda_p$ which are combined by the optical coupler 40 are put into the optical fiber 10, and an idler lightwave of wavelength $\lambda_{i1}$ is output therefrom, so that the idler lightwave having passed through the bandpass filter 41 is handled as a new signal lightwave. The new signal lightwave of wavelength $\lambda_{i1}$ and a pump lightwave (second pump lightwave) having a wavelength $\lambda_{p2}$ which is output from a pump light source (second pump light source) 51 and which has passed through a polarization controller 54 are combined by an optical coupler 60 (second optical coupler), and they are input into an optical fiber (second optical fiber) 11 via an optical amplifier 62. Then, the signal lightwave of wavelength $\lambda_{i1}$ and the pump lightwave of wavelength $\lambda_{p2}$ propagate through the optical fiber 11, whereby a nonlinear optical phenomenon is caused so that an idler lightwave (second idler lightwave) having a wavelength $\lambda_{i2}$ is output, and lightwaves other than the idler lightwave of wavelength $\lambda_{i2}$ are removed via a bandpass filter 61. Thus, the second idler lightwave is obtained. In such case, the fiber optic device 4 handles the signal lightwave of wavelength $\lambda_s$ and the idler lightwave of wavelength $\lambda_{i1}$ as lightwaves having an arbitrary wavelength included in the C-band and the idler lightwave of wavelength $\lambda_{i2}$ (second idler lightwave) as a lightwave having an optional wavelength in the practical L-band.

In the fiber optic device 4, the wavelength conversion is accomplished by the second optical fiber 11 from a lightwave having an arbitrary wavelength in the C-band to a lightwave having an optional wavelength of the practical L-band. In such case, preferably the wavelength $\lambda_{p2}$ of the pump lightwave that is output from the pump light source 51 so as to be incident on the optical fiber 11 is around $2\times(1530^{-1}+1605^{-1})^{-1}=1566.7$ nm which falls on the middle between the C-band and the practical L-band, and the wavelength conversion is conducted with an optical fiber 11 having a zero dispersion wavelength $\lambda_z$ of about 1567 nm. With the fiber optic device 4 which has two optical fibers and performs wavelength conversion twice, causing the spectrum inversion twice, the spectrum of the idler lightwave is not inversed to the spectrum of the signal lightwave of wavelength $\lambda_s$.

Figure 17:
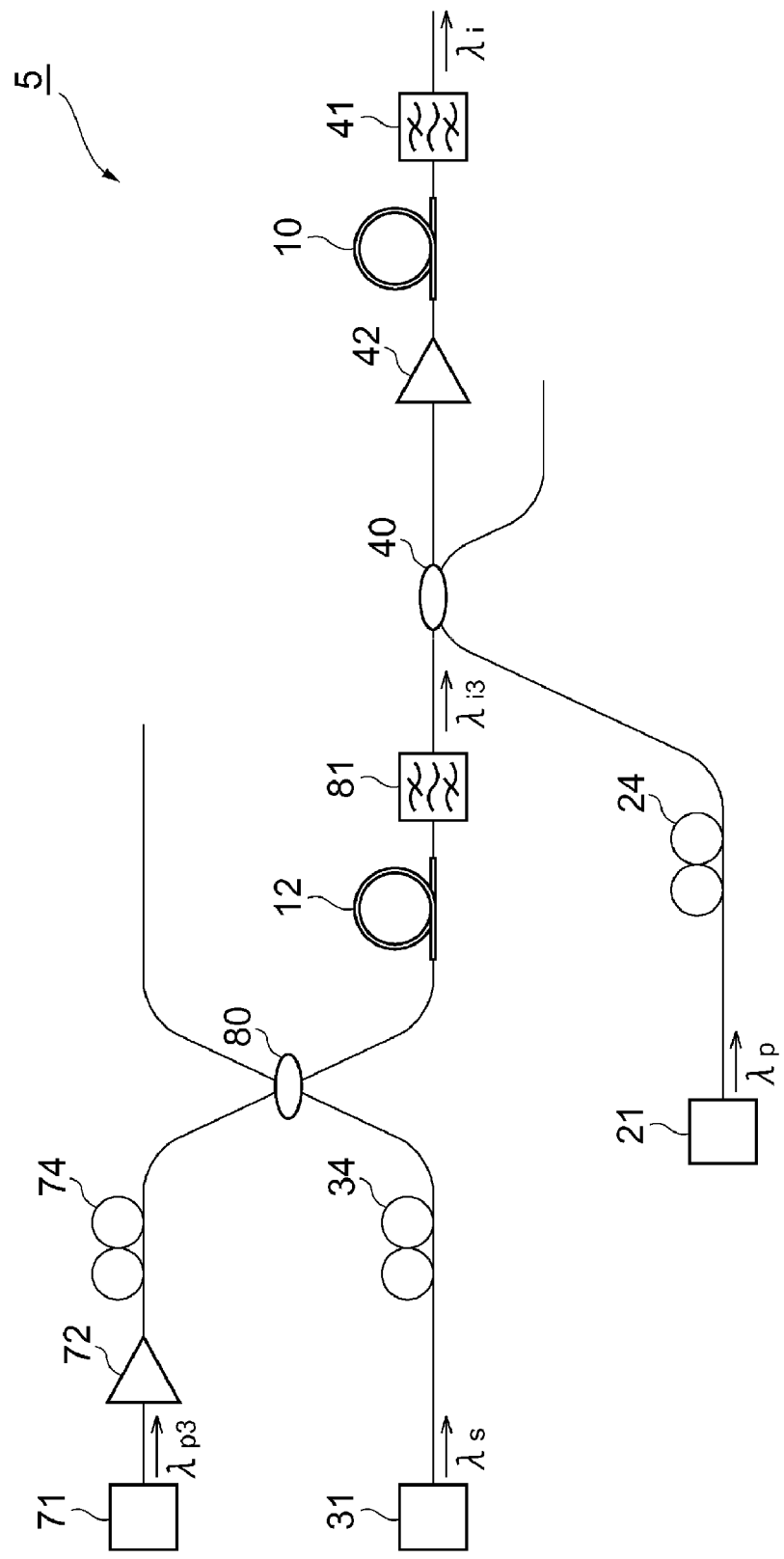
FIG. 17 is a conceptional schematic diagram of a fiber optic device according to Embodiment 5 of the present invention.

FIG. 17 is a conceptional schematic diagram of a fiber optic device according to Embodiment 5 of the present invention. A fiber optic device 5 is such that a structure for performing wavelength conversion is added to an upstream part of the fiber optic device 1, that is, an optical fiber 12 is provided at a part upstream of the optical fiber 10.

More specifically, a pump lightwave having a wavelength $\lambda_{p3}$ (third pump lightwave), which is output from a pump light source (third pump light source) 71 and passes through an optical amplifier 72 and a polarization controller 74, and a signal lightwave (second signal lightwave) having a wavelength $\lambda_s$ ($\lambda_4$), which is output from a signal light source (second signal light source) 31 and passes through a polarization controller 34, are combined by an optical coupler 80 (third optical coupler) and input into an optical fiber 12 (third optical fiber). Thus, an idler lightwave (third idler lightwave) having a wavelength $\lambda_{i3}$ which occurs due to a nonlinear optical phenomenon is output from the optical fiber 12. Moreover, lightwaves having wavelengths other than the wavelength $\lambda_{i3}$ of the idler lightwave is removed via a bandpass filter 81. Subsequently, the idler lightwave having the wavelength $\lambda_{i3}$ and the pump lightwave having a wavelength $\lambda_p$, which is output from the pump light source 21 and passes through the polarization controller 24, are combined by the optical coupler 40, and input into the optical fiber 10 via the optical amplifier 42. Then, the idler lightwave having a wavelength $\lambda_i$ which occurs due to the nonlinear optical phenomenon is output from optical fiber 10, and lightwaves having wavelengths other than the wavelength $\lambda_i$ of the idler lightwave are removed via the bandpass filter 41. In the case of such structure, the signal lightwave of wavelength $\lambda_s$ is a lightwave having an arbitrary wavelength included in the C-band, and the idler lightwave of wavelength $\lambda_{i3}$ and the idler lightwave of wavelength $\lambda_i$ are lightwaves having an optional wavelength included in the practical L-band.

In such case, by making the wavelength $\lambda_{p3}$ of the pump lightwave output from the pump light source 71 to be around 1566.6 nm and using the optical fiber 12 whose zero dispersion wavelength is about 1567 nm, it is made possible to convert a signal lightwave having an optional wavelength $\lambda_s$ in the C-band to an idler lightwave having an optional wavelength $\lambda_{i3}$ in the practical L-band. Then, the wavelength $\lambda_p$ of the pump lightwave that is output from the pump light source 21 so as to be input to the optical fiber 10 is made to be a wavelength included in the practical L-band, and the pump lightwave of wavelength $\lambda_p$ is combined with the idler lightwave of wavelength $\lambda_{i3}$, and they are input into the optical fiber 10 having a zero dispersion wavelength $\lambda_z$ of about 1587.3 nm, whereby it is made possible to output an idler lightwave having an optional wavelength $\lambda_i$ of the practical L-band.

Figure 18:
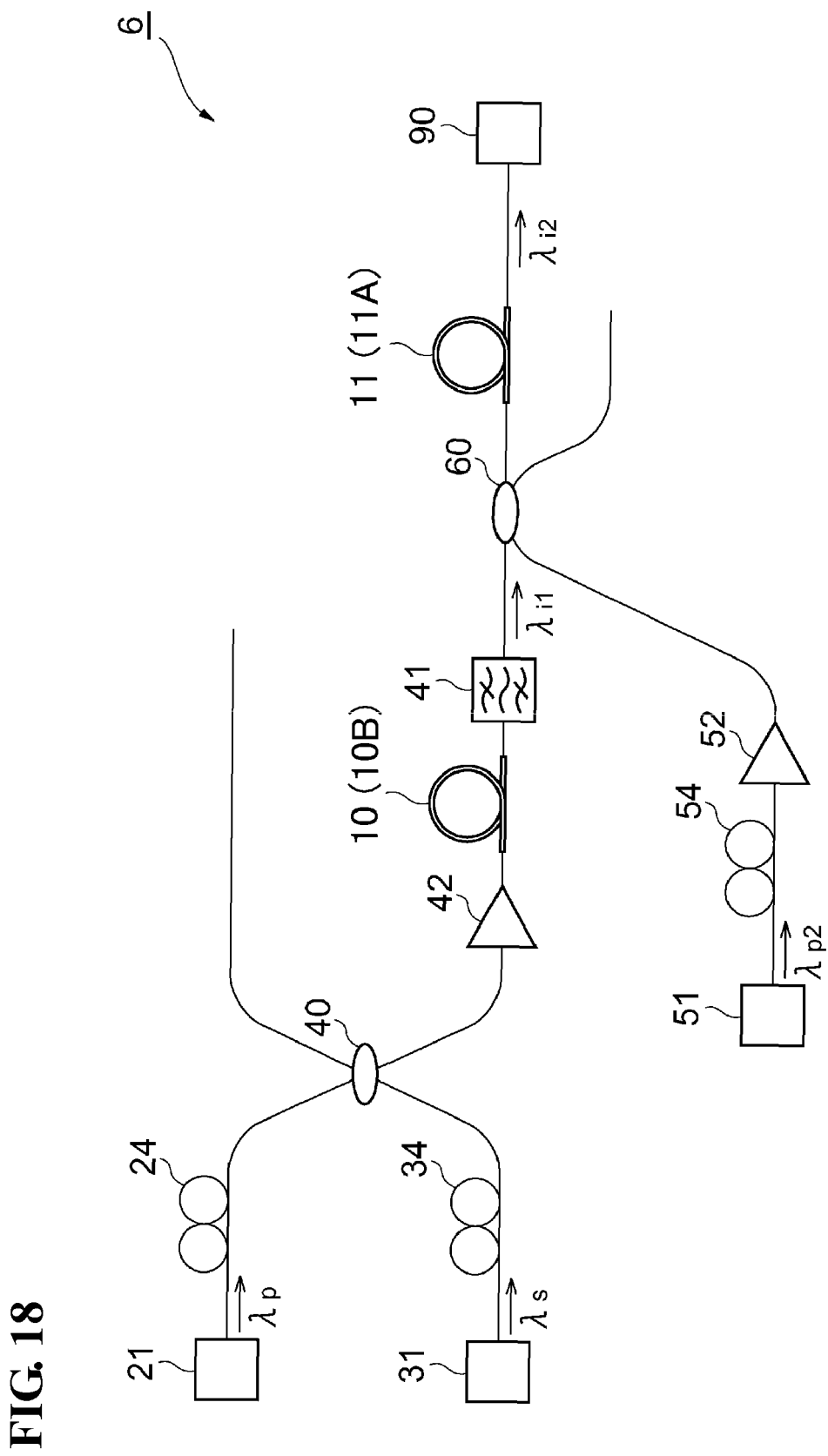
FIG. 18 is a conceptional schematic diagram of a fiber optic device according to Embodiment 6 of the present invention.

FIG. 18 is a conceptional schematic diagram of a fiber optic device according to Embodiment 6 of the present invention. The conversion efficiency of converting the signal lightwave to the idler lightwave was confirmed using a fiber optic device 6. The fiber optic device 6 differs from the fiber optic device 4 such that the optical amplifier 22 on the optical path of the pump light source 21 is removed and the optical amplifier 42 is provided between the optical coupler 40 and the optical fiber 10 (optical fiber 10B in the case of Embodiment 6), and such that while the optical amplifier 62 and the bandpass filter 61 are removed downstream of the optical coupler 60, an optical amplifier 52 is provided downstream of the polarization controller 54 arranged on the optical path of the pump light source 51.

First, an explanation on wavelength conversion by an optical fiber 10B on the upstream side of the fiber optic device 6 will be given. A DS-NHLF of 150 m in length having the characteristics shown in the Table is used as the optical fiber 10B.

The wavelength $\lambda_p$ of the pump lightwave output from the pump light source 21 was adjusted to satisfy $\lambda p=2\times(\lambda_s^{-1}+\lambda_{i1}^{-1})^{-1}$ in correspondence with the wavelength $\lambda_{i1}$ of the idler lightwave available upon wavelength conversion through the optical fiber 10B. Also, the polarization was adjusted using polarization controllers 24 and 34 so that the output power of the idler lightwave of wavelength $\lambda_{i1}$ may become maximum. Moreover, the optical amplifier 42 consisting of an EDFA was used to amplify so that the pump lightwave of wavelength $\lambda_p$ and the signal lightwave of wavelength $\lambda_s$ became about 50 mW (+17 dBm), respectively, after being combined.

Figure 19:
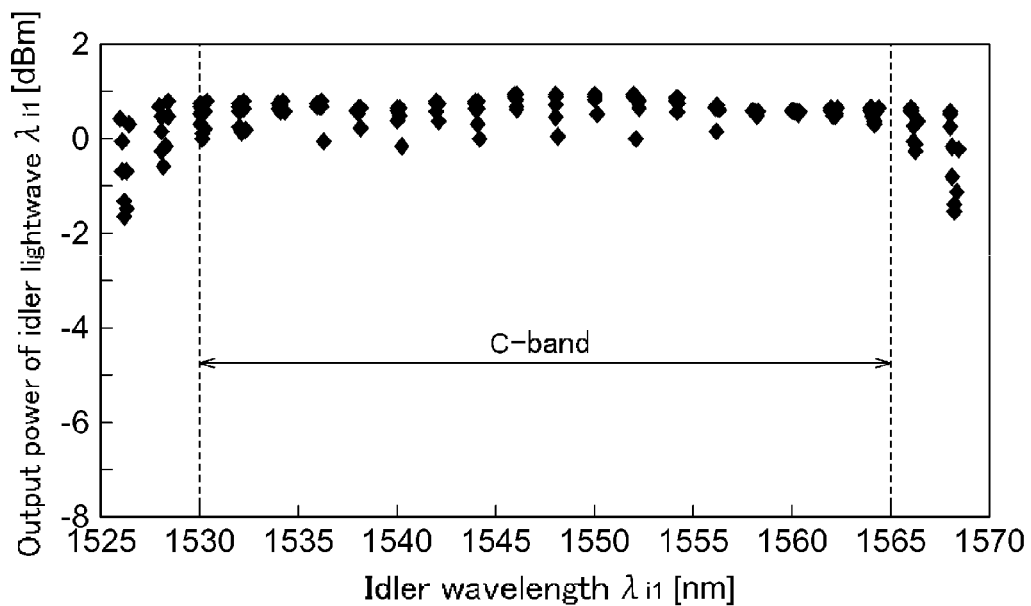
FIG. 19 is a graph showing the relationship between the wavelength and the output power of an idler lightwave emitted from an optical fiber located at the upstream part of the device in the case where the pump wavelength is changed at the upstream part of the fiber optic device relating to Embodiment 6.

FIG. 19 is a graph showing the relationship between the wavelength $\lambda_{i1}$ and the output power of an idler lightwave emitted from an optical fiber 10B in the case where the pump wavelength $\lambda_p$ is changed in the fiber optic device 6. The wavelengths $\lambda_s$ of 1530, 1532 . . . 1564, and 1566 nm were used as signal lightwaves, and the wavelength $\lambda_{i1}$ of an idler lightwave was adjusted by changing the wavelength $\lambda_p$ of a pump lightwave relative to the respective signal lightwave. The power of the idler lightwave of wavelength $\lambda_{i1}$ is within the range of +0.8 to −0.2 dBm, which shows that the lightwave having an arbitrary wavelength in the C-band is converted within the conversion efficiency variation of 1.0 dB.

In the following, the wavelength conversion by an optical fiber 11A arranged on the downstream part of the fiber optic device 6 will be explained. A DS-NHLF having a length of 200 m and the characteristics shown in the Table was used as the optical fiber 11A which performs wavelength conversion at the downstream part. The fourth-order dispersion $\beta_4$ of the DS-NHLF was +0.18×10$^4$ ps$^4$/km.

The wavelength $\lambda_{p2}$ of the pump lightwave that is output from the pump light source 51 and input into the optical fiber 11A was 1566.6 nm. Also, the power of the pump lightwave of wavelength $\lambda_{p2}$ that is output from the optical amplifier 52 and input into the optical fiber 11A was +23 dBm.

Figure 20:
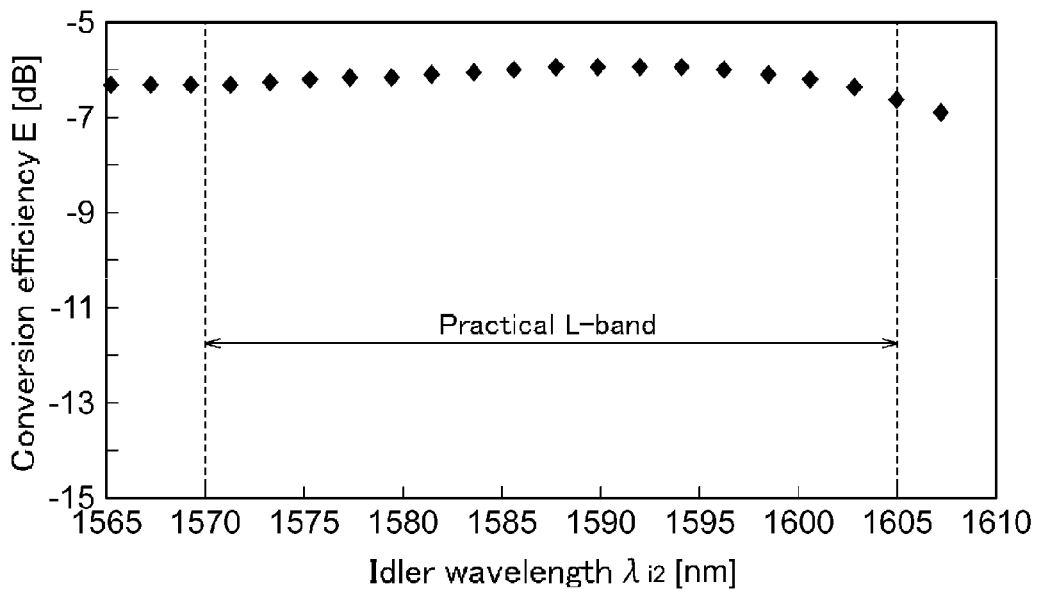
FIG. 20 is a graph showing the relationship between the conversion efficiency and the wavelength of an idler lightwave emitted from the optical fiber arranged in the downstream part of the fiber optic device relating to Embodiment 6.

FIG. 20 is a graph showing the relationship between conversion efficiency and wavelength $\lambda_{i2}$ of an idler lightwave emitted from the optical fiber 11A in the fiber optic device 6. The variation of the conversion efficiency E in the above-mentioned practical L-band having a wavelength of 1570 to 1605 nm is 0.6 dB or less.

Figure 21:
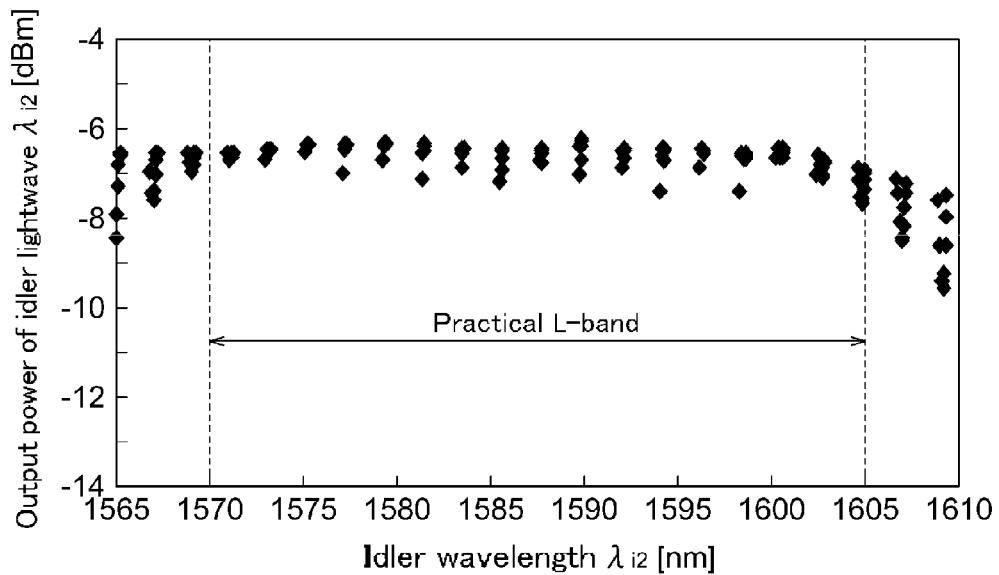
FIG. 21 is a graph showing the relationship between the wavelength of idler lightwave and the output power of idler lightwave in the fiber optic device relating to Embodiment 6.

FIG. 21 is a graph showing the relationship between the wavelength $\lambda_{i2}$ of an idler lightwave and the power of the idler lightwave in the fiber optic device 6. The power of the idler lightwave of wavelength $\lambda_{i2}$ was in the range of −6.2 to −7.8 dBm, and the wavelength conversion was achieved such that the variation of the power was restrained to within 1.6 dB.

As described above, with the fiber optic device 6 shown in the embodiment a lightwave having an optional wavelength included in a wide band (e.g., C-band) can be converted to a lightwave having an optional wavelength included in another band (e.g., the practical L-band), and such conversion can be achieved at high conversion efficiency. This fiber optic device can be applied to various applications such as light delay using the dispersion value of an optical fiber (for example, refer to Non-patent document 5).

The embodiment of the present invention is not limited to the embodiments described above. For example, the embodiment may be such that the power of the idler lightwave of wavelength $\lambda_i$ is higher than the power of the signal lightwave of wavelength $\lambda_s$. Such embodiment can be realized by making the input power of the pump lightwave of wavelength $\lambda_p$ stronger.

Also, a preferable structure is such that the wavelength band of signal lightwave of wavelength $\lambda_s$ and idler lightwave of wavelength $\lambda_i$ includes at least the C-band or the practical L-band, and moreover the width of the wavelength band is preferably 35 nm or more. In the above, the embodiment is explained using the C-band of 1530 to 1565 nm wavelength and the practical L-band of 1570 to 1605 nm wavelength; however, it is also possible to realize the wavelength conversion from a wider band to a wider band.

Figure 22:
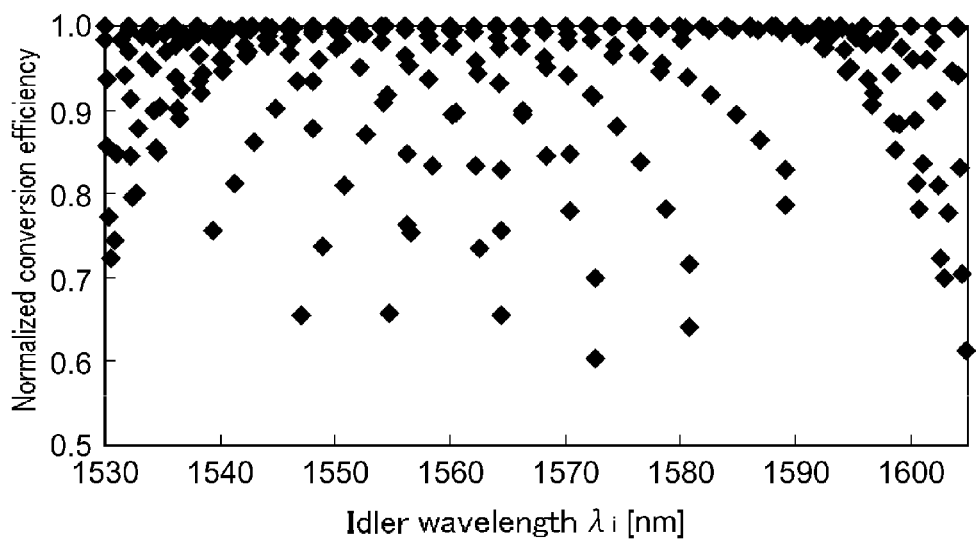
FIG. 22 is a graph showing the relationship between the wavelength of an idler lightwave and the fluctuation of the normalized conversion efficiency as determined by defining the maximum wavelength conversion efficiency as 1, in the case of wavelength conversion in a wavelength band including C-band and L-band for practical use.

FIG. 22 is a graph showing the relationship between the wavelength $\lambda_i$ of an idler lightwave and the variation of the normalized conversion efficiency as determined by defining the maximum wavelength conversion efficiency as 1, in the wavelength conversion in which a lightwave having an arbitrary wavelength included in the C-band and the practical L-band (wavelength: 1530 to 1605 nm) is converted to a lightwave included in such wavelength band. Here, the wavelength of an idler lightwave was adjusted by using a DS-NHLF having a dispersion slope of +0.015 ps/nm$^2$/km, zero dispersion wavelength of 1563.5 nm, fiber length of 25 m, making the signal lightwaves 1530, 1532 . . . 1604, 1606 nm, and tuning the pump wavelength. It is possible to realize arbitrary wavelength conversion in a wavelength band including the C-band and the practical L-band since the conversion efficiency E normalized by defining the maximum value as 1 is 0.6 or more in all wavelengths.

Citation List

Non-Patent Literature

Non-patent literature 1: T. Okuno et al., Electron. Lett., 39(2003) pp 972-974.

Non-patent literature 2: M. Takahashi et al., J. Lightwave Techn., 23(2005) pp 3615-3624

Non-patent literature 3: C. G. Joergensen et al., ECOC-IOOC 2003 Proc., Vol. 3(2003) pp 556-557

Non-patent literature 4: K. P. Hansen, Optics Express, 11(2003) pp 1503-1509.

Non-patent literature 5: A. Zhang et al., Optics Letters, 30(2005) pp 2375-2377.

What is claimed is:

1. A fiber optic device for generating an idler lightwave having a wavelength $\lambda_2$ from a signal lightwave of wavelength $\lambda_1$ that has been input into the fiber optic device, the wavelength $\lambda_1$ being an arbitrary wavelength included in a first wavelength band between a wavelength $\lambda_x$ and a wavelength $\lambda_y$, and the wavelength $\lambda_2$ being an arbitrary wavelength included in a second wavelength band and being different from the wavelength $\lambda_1$, wherein the fiber optic device comprises:

a wavelength tunable pump light source for outputting a pump lightwave having a wavelength of $2\times(\lambda_1^{-1}+\lambda_2^{-1})^{-1}$;

an optical coupler for coupling and outputting the pump lightwave and the signal lightwave; and an optical fiber having a length of 450 m or less, the zero-dispersion wavelength thereof being in the first wavelength band, the dispersion slope thereof at the zero-dispersion wavelength being +0.01 ps/nm²/km or more and +0.045 ps/nm²/km or less, wherein the optical fiber allows propagation of the signal lightwave and the pump lightwave output from the optical coupler, and generates an idler lightwave by means of a nonlinear optical phenomenon occurring during such propagation.

2. A fiber optic device as set forth in claim 1, wherein in the case of the input power of the pump lightwave incident on the optical fiber and the input power of the signal lightwave being substantively constant, the width of the first wavelength band and the width of the second wavelength band are respectively equal to or more than 30 nm, and the variation of power of the idler lightwave is 3 dB or less relative to the combination of an optional $\lambda_1$ in the first wavelength band and an optional $\lambda_2$ in the second wavelength band.

3. A fiber optic device as set forth in claim 1, wherein the length of the optical fiber is equal to or more than 25 m.

4. A fiber optic device as set forth in claim 1, wherein the nonlinear coefficient of the optical fiber is equal to or more than 15/W/km in a linear polarization state.

5. A fiber optic device as set forth in claim 1, wherein the zero-dispersion wavelength of the optical fiber is within the wavelength range of $2\times(\lambda_x^{-1}+\lambda_y^{-1})^{-1}\pm 6$ nm.

6. A fiber optic device as set forth in claim 1, further comprising:
   a second pump light source for outputting a second pump lightwave;
   a second optical coupler for coupling and outputting the idler lightwave and the second pump lightwave; and
   a second optical fiber for propagating the idler lightwave and the second pump lightwave coupled and output by the second optical coupler, wherein a second idler lightwave having a wavelength $\lambda_3$ is generated due to a nonlinear optical phenomenon occurring during the propagation of the idler lightwave and the second pump lightwave through the second optical fiber, whereas the wavelength $\lambda_3$ is included in a third wavelength band and different from the wavelength $\lambda_2$.

7. A fiber optic device as set forth in claim 1, further comprising:
   a third pump light source for outputting a third pump lightwave;
   a third optical coupler for coupling the third pump lightwave and a second signal lightwave having a wavelength $\lambda_4$; and
   a third optical fiber for propagating the second signal lightwave and the third pump lightwave coupled and output by the third optical coupler, wherein the signal lightwave having the wavelength $\lambda_1$ is generated due to a nonlinear optical phenomenon occurring during the propagation of the second signal lightwave and the third pump lightwave through the third optical fiber, whereas the wavelength $\lambda_4$ is included in a fourth wavelength band different from the wavelength $\lambda_1$.

8. A fiber optic device as set forth in claim 2, wherein the first wavelength band has wavelengths of 1530 nm to 1565 nm.

9. A fiber optic device as set forth in claim 2, wherein the first wavelength band is the same as the second wavelength band.

10. A fiber optic device as set forth in claim 9, wherein the first wavelength band and the second wavelength band have wavelengths of 1530 nm to 1565 nm.

11. A fiber optic device as set forth in claim 2, wherein the first wavelength band and the second wavelength band have wavelengths of 1570 nm to 1605 nm.

* * * * *